US012632063B2

(12) United States Patent
Li et al.

(10) Patent No.: US 12,632,063 B2
(45) Date of Patent: May 19, 2026

(54) POSITIONING METHOD FOR CEILING VISION ROBOT

(71) Applicant: AMICRO SEMICONDUCTOR CO. , LTD., Zhuhai (CN)

(72) Inventors: Ming Li, Zhuhai (CN); Yongyong Li, Zhuhai (CN)

(73) Assignee: AMICRO SEMICONDUCTOR CO., LTD., Zhuhai (CN)

( * ) Notice: Subject to any disclaimer, the term of this patent is extended or adjusted under 35 U.S.C. 154(b) by 97 days.

(21) Appl. No.: 18/715,094

(22) PCT Filed: Nov. 8, 2022

(86) PCT No.: PCT/CN2022/130469
§ 371 (c)(1),
(2) Date: May 30, 2024

(87) PCT Pub. No.: WO2023/098415
PCT Pub. Date: Jun. 8, 2023

(65) Prior Publication Data
US 2025/0028330 A1      Jan. 23, 2025

(30) Foreign Application Priority Data
Nov. 30, 2021     (CN) .......................... 202111441428.6

(51) Int. Cl.
G05D 1/246          (2024.01)
G05D 107/40         (2024.01)
(Continued)

(52) U.S. Cl.
CPC ........... G05D 1/2462 (2024.01); G06T 7/248 (2017.01); G06T 7/60 (2013.01); G06T 7/74 (2017.01);
(Continued)

(58) Field of Classification Search
CPC .. G05D 1/00; G05D 2107/00; G05D 2111/00; G06T 7/00; G06T 2207/00; G06V 10/00; G06V 20/00
See application file for complete search history.

(56) References Cited

U.S. PATENT DOCUMENTS 11,037,320 B1 *   6/2021   Ebrahimi Afrouzi .. G01C 3/085
12,046,140 B2 *   7/2024   Oyama ................... G08G 1/164
(Continued)

FOREIGN PATENT DOCUMENTS

CN         103631264 A      3/2014
CN         103680291 A      3/2014
(Continued)

OTHER PUBLICATIONS

Zhang, "CN103680291A Translation", Mar. 26, 2014 (Year: 2014).*
(Continued)

*Primary Examiner* — Aniss Chad
*Assistant Examiner* — Elizabeth J Slowik
(74) *Attorney, Agent, or Firm* — The Sun IP Law

(57)                    ABSTRACT

A positioning method for a ceiling vision robot are provided. The method includes: during a moving process, a ceiling vision robot acquiring a ceiling image in real time; acquiring existing road sign distribution information according to the ceiling image; determining whether to establish a new road sign, according to the existing road sign distribution information, if so, establishing a new road sign at a acquisition position of the ceiling image, if not, not establishing the new road sign at the acquisition position of the ceiling image; and monitoring the positioning effectiveness of an existing road sign according to the existing road sign distribution information, if the positioning of the existing road sign is effective, performing positioning by using pose information corresponding to the existing road sign, if the positioning of
(Continued)

the existing road sign is ineffective, not performing positioning by using the pose information corresponding to the existing road sign.

11 Claims, 2 Drawing Sheets

(51) Int. Cl.

| | | |
|---|---|---|
| *G06T 7/246* | (2017.01) | |
| *G06T 7/60* | (2017.01) | |
| *G06T 7/73* | (2017.01) | |
| *G06V 10/44* | (2022.01) | |
| *G06V 20/10* | (2022.01) | |
| *G06V 20/56* | (2022.01) | |

(52) U.S. Cl.
CPC .......... *G06V 10/443* (2022.01); *G06V 20/176* (2022.01); *G06V 20/56* (2022.01); *G05D 2107/40* (2024.01); *G06T 2207/30244* (2013.01)

(56) References Cited

U.S. PATENT DOCUMENTS

| | | | |
|---|---|---|---|
| 2004/0168148 | A1 | 8/2004 | Goncalves et al. |
| 2014/0235267 | A1 | 8/2014 | Song et al. |
| 2015/0278615 | A1* | 10/2015 | Ogawa .................... H04N 7/183 |
| | | | 348/148 |
| 2016/0117923 | A1* | 4/2016 | Dannenbring ......... G06V 20/56 |
| | | | 340/905 |
| 2018/0149487 | A1 | 5/2018 | Lee |
| 2019/0163197 | A1* | 5/2019 | Qiao .................... G06V 20/582 |
| 2019/0279007 | A1* | 9/2019 | Zinner ............... G08G 1/09623 |
| 2021/0270977 | A1* | 9/2021 | Nie ......................... H04W 4/44 |
| 2021/0383141 | A1* | 12/2021 | Togashi ............. G08G 1/09623 |

FOREIGN PATENT DOCUMENTS

| | | |
|---|---|---|
| CN | 105841687 A | 8/2016 |
| CN | 106651990 A | 5/2017 |
| CN | 108180917 A | 6/2018 |
| CN | 109816726 A | 5/2019 |
| CN | 110000786 A | 7/2019 |
| CN | 112686953 A | 4/2021 |

OTHER PUBLICATIONS

The first office action of counterpart CN application No. 2021114414286 issued on Mar. 29, 2025.
Zhu Qidan; Liu Peng; Cai Chengtao; Robust method of indoor robot localization based on artificial landmark, Journal of Computer Applications, 1001-9081 (2017) S1-0126-05, pp. 133-137; Jun. 15, 2017.

* cited by examiner

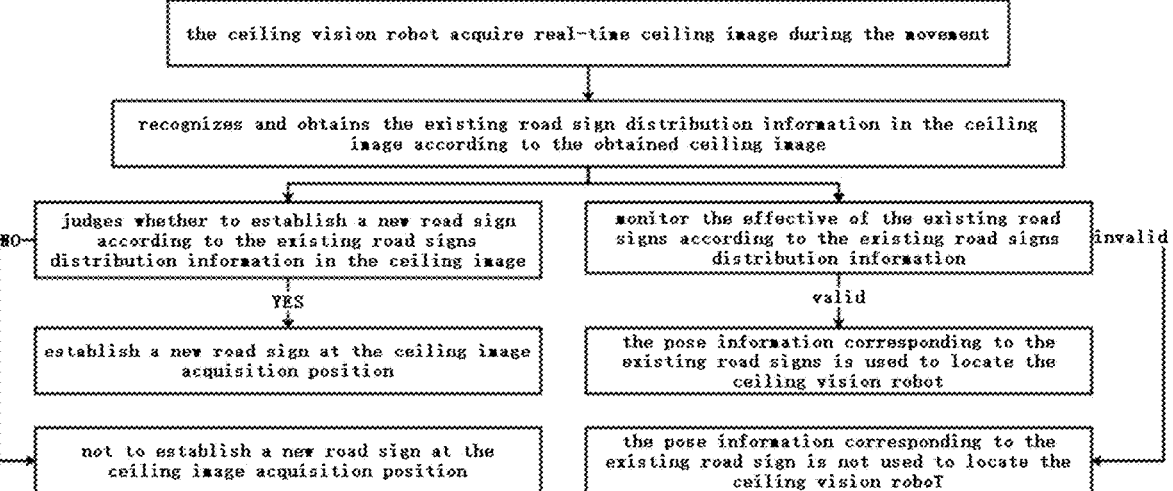

the ceiling vision robot acquire real-time ceiling image during the movement recognizes and obtains the existing road sign distribution information in the ceiling image according to the obtained ceiling image judges whether to establish a new road sign according to the existing road signs distribution information in the ceiling image

NO monitor the effective of the existing road signs according to the existing road signs distribution information invalid

YES valid establish a new road sign at the ceiling image acquisition position the pose information corresponding to the existing road signs is used to locate the ceiling vision robot not to establish a new road sign at the ceiling image acquisition position the pose information corresponding to the existing road sign is not used to locate the ceiling vision robot

Fig. 1

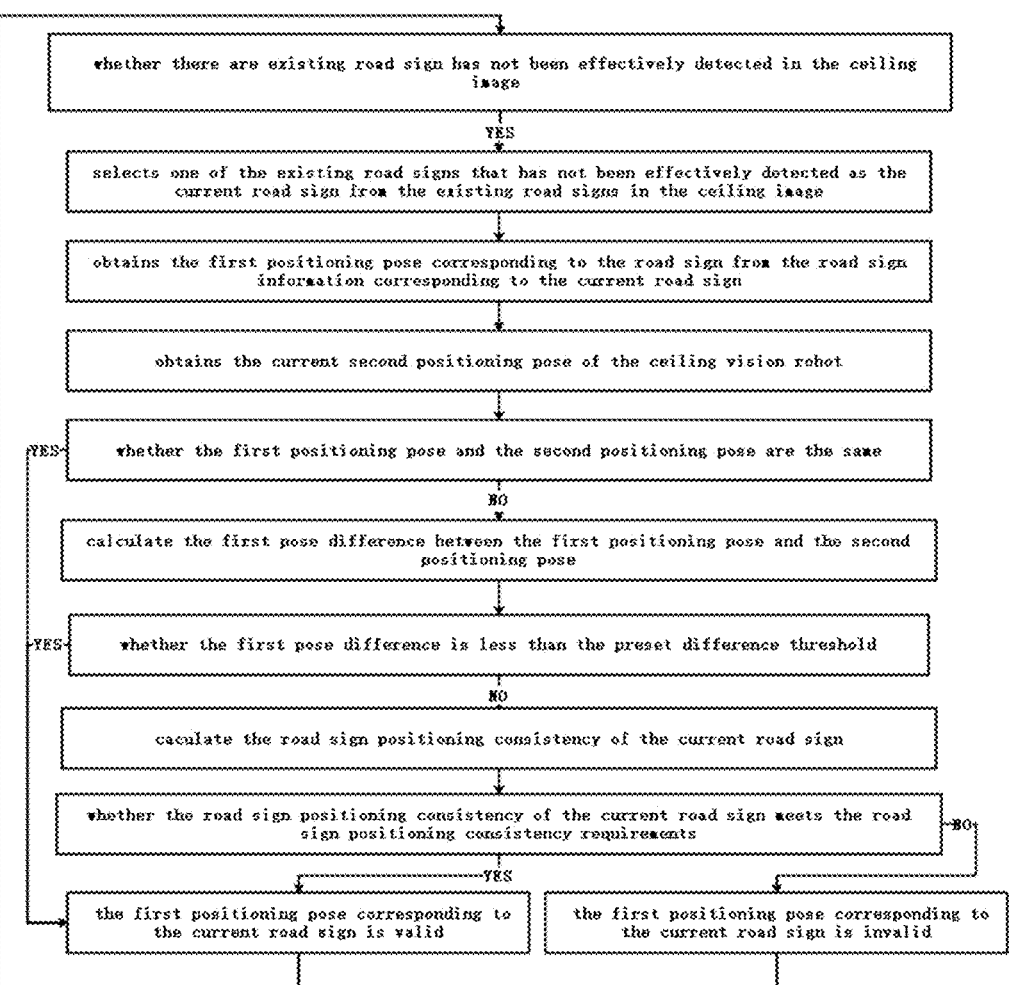

whether there are existing road sign has not been effectively detected in the ceiling image

YES selects one of the existing road signs that has not been effectively detected as the current road sign from the existing road signs in the ceiling image obtains the first positioning pose corresponding to the road sign from the road sign information corresponding to the current road sign obtains the current second positioning pose of the ceiling vision robot whether the first positioning pose and the second positioning pose are the same — YES

NO calculate the first pose difference between the first positioning pose and the second positioning pose whether the first pose difference is less than the preset difference threshold — YES

NO caculate the road sign positioning consistency of the current road sign whether the road sign positioning consistency of the current road sign meets the road sign positioning consistency requirements — NO

YES the first positioning pose corresponding to the current road sign is valid the first positioning pose corresponding to the current road sign is invalid

Fig. 2

POSITIONING METHOD FOR CEILING VISION ROBOT

CROSS-REFERENCE TO RELATED APPLICATION

The present disclosure claims the priority of Chinese Patent Application No. 202111441428.6, filed with the China National Intellectual Property Administration on Nov. 30, 2021 and entitled "Positioning method for ceiling vision robot", which is incorporated herein by reference in its entirety.

TECHNICAL FIELD

The present disclosure relates to the technical field of robot positioning, in particular to a positioning method for a ceiling vision robot.

BACKGROUND

With the increasing maturity of robot technology, the means of robot positioning technology have become more diverse. At present, robot positioning technology includes positioning based on visual sensors, positioning based on laser radar and positioning based on inertial navigation systems. Among them, the positioning technology of robots based on visual sensors mainly uses image recognition road signs for positioning. The road signs can be environmental road signs, robot-built road signs, or artificially arranged road signs. At present, in visual robot road sign recognition and construction technology, the uneven construction of road signs leads to low positioning accuracy of visual robots and the problem of high positioning error rate. At the same time, there is also the problem that the environmental characteristics are easily confused, and the visual robot cannot accurately identify road signs, resulting in positioning errors.

SUMMARY

Some embodiments of the present disclosure are as follows:

The positioning method of the ceiling vision robot specifically includes: the ceiling vision robot acquires ceiling images in real time during its movement; the ceiling vision robot obtains existing road signs distribution information according to the ceiling image recognition; the ceiling vision robot judges whether to establish a new road sign according to the existing road signs distribution information; if so, the ceiling vision robot is controlled to establish a new road sign at a acquisition position of the ceiling image; if not, the ceiling vision robot is controlled not to establish a new road sign at the acquisition position of the ceiling image; the ceiling vision robot monitors position effectiveness of existing road signs based on the existing road sign distribution information; if the existing road sign positioning is valid, the ceiling vision robot is positioned using pose information corresponding to the existing road signs; if the existing road sign positioning is invalid, then the pose information corresponding to the existing road sign is not used to locate the ceiling vision robot.

In some embodiments, the method for the ceiling vision robot to obtain existing road sign distribution information according to ceiling image recognition specifically includes: the ceiling vision robot recognizes whether there are existing road signs in the ceiling image; if it exists, the distance respectively between all the existing road signs in the ceiling image and the acquisition position of the ceiling image are calculated as the existing road sign distribution information; if it does not exist, the distance respectively between all the existing road signs that have been established and the acquisition position of the ceiling image are calculated, and the corresponding illumination information of all the existing road signs that have been established when they are established are obtained; the distance respectively between all the existing road signs that have been established and the acquisition position of the ceiling image, and the illumination information corresponding to all the established road signs when they are established are used as the existing road signs distribution information.

In some embodiments, the method for the ceiling vision robot to identify whether there are existing road signs in the ceiling image specifically includes: the ceiling vision robot extracts corner features from the ceiling image; the corner features are matched with features of all the existing road signs; if the features of the existing road signs are successfully matched with the corner features, it is confirmed that there are the existing road signs in the ceiling image and the existing road signs successfully matched with the corner features is recorded as the existing road signs in the ceiling image, and if none feature of the existing road signs is successfully matched with the corner features, then there are no the existing road signs in the ceiling image.

In some embodiments, the method for the ceiling vision robot to judge whether to establish the new road sign according to the existing road signs distribution information specifically includes: when there are the existing road signs in the ceiling image, whether the distance respectively between all the existing road signs in the ceiling image and the acquisition position of the ceiling image is greater than a first distance threshold according to the acquired existing road sign distribution information is judged, and if so, the ceiling vision robot is controlled to establish new road sign in the acquisition position of the ceiling image, if not, the ceiling vision robot is not controlled to establish new road sign in the acquisition position of the ceiling image; when there is no the existing road sign in the ceiling image, it is judged according to the obtained existing road sign distribution information whether there is a road sign whose distance from the acquisition position of the ceiling image is less than a second distance threshold among all the existing road signs that have been established, and if not, the ceiling vision robot is controlled to establish the new road sign at the acquisition position of the ceiling image. If it exists, according to the acquired distribution information of the existing road sign, whether illumination information corresponding to the ceiling image is different with illumination information corresponding to all the existing road signs when they are built in a shaped area of the acquisition position of the ceiling image as a center and the radius as the second distance threshold is judged. If so, the ceiling vision robot is controlled to create the new road sign at the acquisition position of the ceiling image. If not, the ceiling vision robot is controlled to not create the new road sign at the acquisition position of the ceiling image.

In some embodiments, the method for the ceiling vision robot to judge whether to establish new road signs according to the existing road sign distribution information also includes: when duration of the ceiling vision robot observes in real time during the moving process that there is no existing road sign in the ceiling image reaches a first time threshold, the ceiling vision robot establishes the new road sign at the acquisition position of the ceiling image.

In some embodiments, the method for the ceiling vision robot to establish the new road sign at the acquisition position of the ceiling image specifically includes: the ceiling vision robot acquires and records the road sign information corresponding to the new road sign at the acquisition position of the ceiling image; wherein, the road sign information includes: pose information of the ceiling vision robot at the acquisition position of the ceiling image, angle information of the ceiling vision robot at the acquisition position of the ceiling image, pose information of the road sign relative to the ceiling vision robot, corresponding illumination information when the ceiling vision robot acquires the ceiling image, the corner features of the ceiling image that the ceiling vision robot acquired which are used as features of the road signs and a latest observation moment of the road signs.

In some embodiments, the method for the ceiling vision robot monitors the position effectiveness of the existing road signs based on the existing road sign distribution information specifically includes: when there are the existing road signs in the ceiling image, the ceiling vision robot selects one of the existing road signs that has not been effectively detected as a current road sign from all the existing road signs in the ceiling image, and the first positioning pose of the current road sign is obtained from the road sign information corresponding to the current road sign; the ceiling vision robot obtains a current second positioning pose of the ceiling vision robot based on the vision sensor and a inertial sensor; whether the first positioning pose and the second positioning pose are the same is judged; if the first positioning pose and the second positioning pose are the same, it is confirmed that the first positioning pose corresponding to the current road sign is valid; if the first positioning pose and the second positioning pose are positioned differently, then a first pose difference between the first positioning pose and the second positioning pose is calculated; whether the first pose difference between the first positioning pose and the second positioning pose is less than a preset difference threshold is judged; if so, it is confirmed that the first positioning pose corresponding to the current road sign is valid; if not, a road sign positioning consistency of the current road sign is calculated based on all recorded observed road signs, and whether the road sign positioning consistency of the current road sign meets the road sign positioning consistency requirements is judged; if the road sign positioning consistency of the current road sign meets the road sign positioning consistency requirements, it is confirmed that the first positioning pose corresponding to the current road sign is valid, and if the road sign positioning consistency of the current road sign does not meet the road sign positioning consistency requirements, it is confirmed that the first positioning pose corresponding to the current road sign is invalid; the above steps are repeated until it is confirmed whether the positioning of all the existing road signs existing in the ceiling image is valid or not.

In some embodiments, the method for calculating the consistency of the current road sign position based on the all recorded observed road signs specifically includes: the consistency of the current road signs with the all recorded observed road signs are matched one by one, and the all recorded observed road signs that are consistent with the current road signs are counted; the consistency of the current road sign positioning is determined base on the number of road signs that are consistent with the current road sign positioning in the all recorded observed road signs.

In some embodiments, the method of matching the consistency of the current road signs with the all recorded observed road signs one by one, and counting the all recorded observed road signs that are consistent with the current road signs, specifically includes: step 1: one of the observed road signs that has not been positioning consistent matching is selected from the all recorded observed road signs as a current positioning consistent matching road sign; step 2: a observation moment of the current positioning consistent matching road sign is obtained and the positioning pose corresponding to the current positioning consistent matching road sign is obtained; step 3: a second pose difference between the first positioning pose corresponding to the current road sign and the positioning pose corresponding to the current road sign is calculated; step 4: according to the inertial sensor of the ceiling vision robot, a first displacement distance of the ceiling vision robot within a time period from the observation moment of the current positioning consistent matching road sign to a observation moment of the current road sign is calculated; step 5: whether the second pose difference is the same as the first displacement distance is determined, if the second pose difference is the same as the first displacement distance, then it is confirmed that the current positioning matching road sign and the current road sign are position consistent, the number of road signs that are consistent with the current road sign positioning in the all recorded observed road signs is controlled to increase by 1, if the second pose difference is not the same as the first displacement distance, it is confirmed that the current positioning matching road sign is positioning inconsistent with the current road sign, and the number of road signs that are consistent with the current road sign positioning in all recorded observed road signs remains unchanged; step 1 to step 5 above are repeated until there is no observed road sign that has not been positioning consistent matching in the all recorded observed road signs, and the number of road signs that are consistent with the current road sign positioning in the all recorded observed road signs is obtained.

In some embodiments, the consistency of the current road sign positioning means that the number of the road signs in the all recorded observed road signs that is consistent with the current road sign positioning reaches a first quantity threshold; wherein, the difference values between the first number threshold and the first pose difference are positively correlated.

In some embodiments, when the all recorded observed road signs have been positioning consistent matching in sequence, and the number of road signs in all recorded observed road signs that are consistent with the current road signs positioning is zero, the current road sign is recorded as the observed road sign and the all recorded observed road signs are updated.

In some embodiments, the method for recording the current road sign as the observed road sign specifically includes: the first positioning pose corresponding to the current road sign is acquired and recorded according to the road sign information corresponding to the current road sign, and the observation moment of the current road sign is recorded at the same time.

In some embodiments, when a position of the observed road sign is consistent with that of the current road sign, the observation moment of the observed road sign is updated to the observation moment of the current road sign.

In some embodiments, when a time length between the observed moment of the recorded observed road sign and the current moment reaches the first time threshold, the observed road sign is deleted from the all recorded observed road signs, and the all recorded observed road signs are updated.

BRIEF DESCRIPTION OF THE DRAWINGS

To describe the technical solutions of the present disclosure more clearly, the following briefly introduces the drawings required for describing the embodiments. It should be understood that the following drawings illustrate only some embodiments of the present disclosure and are not intended to limit the scope of protection of the present disclosure. Similar constituents are indicated in similar numbers in the various figures.

FIG. 1 is a schematic flowchart of a positioning method for a ceiling vision robot according to the first embodiment of the present disclosure.

FIG. 2 is a schematic flowchart of the method for effectively detecting existing road signs according to the seventh embodiment of the present disclosure.

DETAILED DESCRIPTION OF THE EMBODIMENTS

In order to make the object, technical solution and advantages of the present disclosure clearer, the present disclosure will be described and illustrated below in conjunction with the accompanying drawings and embodiments. It should be understood that the specific embodiments described below are only used to explain the present disclosure, not to limit the present disclosure. In addition, it can also be understood that for those skilled in the art, making some design, manufacturing or production changes in the technical content disclosed in the present disclosure is just a conventional technical means, and should not be understood as insufficient content disclosed in the present application.

Unless otherwise defined, the technical terms or scientific terms involved in the present disclosure shall have the usual meanings understood by those of ordinary skill in the technical field to which the present application belongs. The terms "including", "including", "having" and any variations thereof involved in this application are intended to cover non-exclusive inclusion, such as: a process or method including a series of steps, not limited to the listed steps, Instead, steps not listed, or other steps inherent to the process or method, may also be included.

As a preferred embodiment of the present disclosure, the first embodiment of the present disclosure provides a positioning method for a ceiling vision robot, as shown in FIG. 1, the method specifically includes: controlling the ceiling vision robot to acquire real-time ceiling image during the movement; specifically, the ceiling vision robot means that the robot body is equipped with a visual sensor which is capable of collecting ceiling images; the visual sensor can be but not limited to a monocular camera, a binocular camera, a depth camera or a fish-eye camera and other sensors with ceiling image acquisition capabilities.

The ceiling vision robot recognizes and obtains the existing road sign distribution information in the ceiling image according to the obtained ceiling image; specifically, the recognition of the ceiling image by the ceiling vision robot refers to identifying whether there is an existing road sign in the ceiling image; the existing road signs refer to established road signs; the road signs refer to signs used to provide position reference information for the positioning of the ceiling vision robot.

The ceiling vision robot judges whether to establish a new road sign according to the existing road signs distribution information in the ceiling image. If so, the ceiling vision robot is controlled to establish a new road sign at the acquisition position of the ceiling image. If not, the ceiling vision robot is controlled not to establish a new road sign at the acquisition position of the ceiling image; specifically, in this step, the ceiling vision robot judges whether to establish a new road sign according to the existing road sign distribution information, so that the construction of the new road sign can refer to the distribution information of the existing road sign, so that the road sign can be established evenly, and the rationality of road sign establishment is improved.

The ceiling vision robot can monitor the effective of the existing road signs according to the existing road signs distribution information. If the positioning of the existing road signs is valid, the pose information corresponding to the existing road signs is used to locate the ceiling vision robot. Conversely, if the existing road signs are invalid, then the pose information corresponding to the existing road sign is not used to locate the ceiling vision robot. The positioning method of the ceiling vision robot provided by this embodiment collects ceiling images and analyzes the distribution information of existing road signs during the moving process, so as to determine whether to establish road signs, so that the establishment of road signs is uniform and reasonable. Effective detection to ensure the effectiveness of road sign-based positioning and improve the accuracy of road sign-based positioning.

The present disclosure uses ceiling vision robots to weaken the influence of complex and confusing environmental features, and determines whether to establish new road signs according to the distribution information of existing road signs, so as to realize the uniform establishment of road signs, and effectively detects existing road signs from multiple angles to ensure the effectiveness of positioning based on road signs, improves the accuracy of positioning based on road signs.

Based on the above-mentioned first embodiment, as a preferred embodiment of the present disclosure, the method for the ceiling vision robot in the second embodiment of the present disclosure to recognize and obtain the existing road sign distribution information in the ceiling image according to the ceiling image specifically includes: control the ceiling vision robot to identify whether there are existing road signs in the ceiling image; specifically, the method for the ceiling vision robot to identify whether there are existing road signs in the ceiling image can be, but not limited to, using Harris corner detection algorithm and the algorithm of the matching function with image feature recognition, to realizes the detection of whether there are existing road signs in the ceiling image by means of image feature matching.

If the ceiling vision robot recognizes that there is at least one existing road sign in the ceiling image, then calculate the distances respectively between all the existing road signs in the ceiling image and the acquisition position of the ceiling image, and all the distance respectively between all the existing road signs in the ceiling image and the acquisition position of the ceiling image are used as the existing road sign distribution information of the ceiling image; specifically, the method for calculating the distances respectively between all existing road signs existing in the ceiling image and the acquisition position of the ceiling image includes: select an existing road sign from all existing road signs in the ceiling image, obtain the positioning pose corresponding to the existing road sign, obtain the distance between the existing road sign and the acquisition position of the ceiling image according to the acquisition position of the ceiling image and the corresponding positioning pose corresponding to the existing road sign, and repeat the above steps, until all existing road signs existing in the ceiling image are traversed and calculated.

If the ceiling vision robot recognizes that there are no existing road signs in the ceiling image, calculate the distances between all the established road signs and the acquisition position of the ceiling image, and obtain the corresponding illumination information of all the established road signs, the distances respectively between all the existing road signs that have been established and the acquisition position of the ceiling image and the illumination information corresponding to all the existing road signs when they are established are used as the existing road signs distribution information on the ceiling image; specifically, all the established existing road signs refer to all existing road signs established by the ceiling vision robot; the method for calculating the distances between all established road signs and the acquisition position of the ceiling image includes: selecting one road sign from all established road signs, obtain the positioning pose corresponding to the existing road sign, obtain the distance between the existing road sign and the acquisition position of the ceiling image according to the acquisition position of the ceiling image and the corresponding positioning pose of the existing road sign, and repeat above steps until the all established road signs have been traversed and calculated.

In this embodiment, according to the existence of existing road signs in the ceiling image, correspondingly obtain the existing road signs distribution information corresponding to the ceiling image. When there are existing road signs in the ceiling image, the establishment of new road signs only needs to refer to the distance between the existing road signs and the ceiling vision robot, and when there are no existing road signs in the ceiling image, the establishment of a new road sign needs to refer to the distance between all existing road signs and the acquisition position of the ceiling image to avoid the existing road signs near the acquisition position of the ceiling image cannot be found due to the limiting factors of the viewing angle of the ceiling image, by counting the distance between all existing road signs and the acquisition position of the ceiling image, to grasped the distance between all existing road signs and the ceiling vision robot, at the same time, the obtained illumination information corresponding to all existing road signs when they are established is used as the existing road signs distribution information. In this method, the corresponding illumination information when the road signs are established is used as a reference factor for the establishment of new road sign, so as to avoid the reliability affects of the overall road sign location caused by different illumination information corresponding to road signs when they are established.

Based on the above-mentioned embodiments, as a preferred embodiment, the method for the ceiling vision robot to identify whether there are existing road signs in the ceiling image in the third embodiment of the present disclosure specifically includes: the ceiling vision robot extracts corner features from the ceiling image; specifically, the method for extracting corner features from the ceiling image by the ceiling vision robot may be, but not limited to, extracting the corner features in the ceiling image based on the Harris corner detection algorithm, or, based on the FAST algorithm, SIFT algorithm and other algorithms with corner feature extraction function to extract the corner features in the ceiling image.

Matching the corner features with the features of all existing road signs. If the features of the existing road signs are successfully matched with the corner features, it is confirmed that there are existing road signs in the ceiling image and records the existing road signs which successfully matched with the corner features as existing road signs existing in the ceiling image, on the contrary, if no existing road signs are successfully matched with corner features, it is confirmed that there are no existing road signs in the ceiling image. Specifically, the corner feature refers to a feature that has a stable property even if the image acquisition angle of view changes in the same scene. The successful matching of the corner features with the features of existing road signs means that the degree of coincidence between the angle features extracted from the ceiling image and the features of existing road signs reaches a preset matching threshold; wherein, the preset matching threshold is based on the value set by the ceiling vision robot positioning accuracy requirement which is used to limit the matching degree of the corner feature and the feature of the existing road sign. It should be noted that the features of the existing road sign are acquired and recorded when the road sign is established. In this embodiment, the reliability of existing road signs in the ceiling image is improved through feature matching.

Based on the above embodiment, as a preferred embodiment, in the fourth embodiment of the present disclosure, the method for the ceiling vision robot to determine whether to establish a new road sign according to the existing road sign distribution information specifically includes: when there are existing road signs in the ceiling image, according to the obtained existing road sign distribution information judged whether all the distances between all existing road signs in the ceiling image and the acquisition position of the ceiling image are greater than the first distance threshold; specifically, the first distance threshold is a value set based on the road sign positioning accuracy requirements of the ceiling vision robot to make the road signs established more uniformly. By judging the distance between the existing road signs in the ceiling image and the acquisition position of the ceiling image, supplemented by distance limitations, to determine whether it is necessary to establish new road signs, so as to enable the ceiling vision robot to have more uniform and reliable road signs for precise positioning.

If the distance between all existing road signs in the ceiling image and the acquisition position of the ceiling image is greater than the first distance threshold, the ceiling vision robot is controlled to establish new road signs at the acquisition position of the ceiling image; specifically, when all the distance between all existing road signs in the ceiling image and the acquisition position of the ceiling image is greater than the first distance threshold, it means that there is no road sign in the circular range which centered on the acquisition position of the ceiling image and the radius is the first distance threshold to provide positioning assistance for the ceiling vision robot. Therefore, it is necessary to establish new road signs, reduce the area not covered by road signs, and improve the reliability of ceiling vision robots using road signs for positioning.

If the distance between all existing road signs in the ceiling image and the acquisition position of the ceiling image is not all greater than the first distance threshold, then control the ceiling vision robot not to establish new road signs at the ceiling image collection location; If there is at least one existing road sign whose distance from the acquisition position of the ceiling image is less than or equal to the first distance threshold among all the existing road signs, it means that there are existing road signs to provide positioning assistance for the ceiling vision robot within a circular range which centered on the acquisition position of the ceiling image and having a radius equal to the first distance threshold, so there is no need to establish new road signs, and avoid the uneven distribution of road signs that leads to dense distribution in some areas and less distribution in other areas.

When there is no existing road sign in the ceiling image, according to the obtained existing road sign distribution information judged whether there is a road sign whose distance from the acquisition position of the ceiling image is smaller than the second distance threshold among all the existing road signs that have been established; specifically, the second distance threshold is a value set according to the accuracy requirements of the ceiling vision robot for road sign positioning to make the establishment of road signs more uniform. It should be noted that the second distance threshold is less than or equal to the first distance threshold.

If there is no road sign whose distance from the acquisition position of the ceiling image is less than the second distance threshold in all the existing road signs that have been established, the ceiling vision robot is controlled to establish a new road sign at the acquisition position of the ceiling image; specifically, in the case of there is no road sign existing in the ceiling image, when there is no road sign whose distance from the acquisition position of the ceiling image is less than the second distance threshold among all the existing road signs that have been established, it means that there are no existing road signs to provide positioning assistance for the ceiling vision robot within a circular range which centered on the acquisition position of the ceiling image and having a radius equal to the second distance threshold. For the purpose of making the road sign establishment more uniform and providing better positioning assistance for the ceiling vision robot, the ceiling vision robot is controlled to create new road signs in the acquisition position of the ceiling image.

If there is a road sign whose distance from the acquisition position of the ceiling image is less than the second distance threshold among all the existing road signs that have been established, then it is judged according to the obtained existing road sign distribution information whether the illumination information corresponding to the ceiling image have different with the illumination information corresponding to all the road signs established in the circular area which centered on the ceiling image, with a radius of the second distance threshold. If so, control the ceiling vision robot to create new road signs at the acquisition position of the ceiling image; if not, control the ceiling vision robot does not create new road signs at the acquisition position of the ceiling image. Specifically, when there are no existing road signs in the ceiling image, and there are road signs whose distance from the acquisition position of the ceiling image is smaller than the second distance threshold among all existing road signs that have been established, the establishment conditions of the new road signs mainly refer factor is transformed from distance to illumination information. By determining whether the illumination information corresponding to the ceiling image and the illumination information corresponding to the road signs whose distance from the ceiling vision robot is less than the second distance threshold are all the same, when there are different situations, in order to improve the reliability of road signs, establish new road signs that implement road signs with different illumination information at that position.

Based on the above-mentioned embodiments, as a preferred embodiment of the present disclosure, the method for the ceiling vision robot in the fifth embodiment of the present disclosure to determine whether to establish new road signs according to the existing road sign distribution information also includes: when the ceiling vision robot observes in real time during the moving process that there are no existing road signs in the ceiling image and the duration reaches the first time threshold, the ceiling vision robot is controlled to establish a new road sign at the acquisition position of the ceiling image. Specifically, the first time threshold is used to limit the longest time period during which the ceiling vision robot cannot observe the existing road signs, which may be but not limited to 3 seconds, 5 seconds or 10 seconds. In this embodiment, when there are no existing road signs in the ceiling image observed in real time during the moving process of the ceiling vision robot and the duration reaches the first time threshold, then for the purpose of making the establishment of road signs more uniform and reducing the non-coverage of road signs, when the first time threshold is reached, a new road sign is established in the corresponding acquisition position of the ceiling image.

Based on the above embodiments, as a preferred embodiment of the present disclosure, the method for the ceiling vision robot to establish a new road sign at the acquisition position of the ceiling image in the sixth embodiment of the present disclosure specifically includes: the ceiling vision robot establishes a new road sign in the acquisition position of the ceiling image and records the road sign information corresponding to the new road sign; wherein, the road sign information includes: the pose information of the ceiling vision robot at the acquisition position of the ceiling image, the angle information of the ceiling vision robot at the acquisition position of the ceiling image, the pose information of the road sign corresponding to the ceiling vision robot, the corresponding illumination information when the ceiling vision robot acquires the ceiling image, the corner features in the ceiling image acquired by the ceiling vision robot as the feature of the road sign and the observation time of the road sign. It should be noted that the observation time of the road sign refers to the acquisition time of the corresponding ceiling image when the road sign is established. In this embodiment, by constructing road sign information, road sign is established at a specified position, and the purpose of assisting positioning of the ceiling vision robot based on road signs is achieved through the pose information contained in the road sign information.

Based on the above embodiments, as a preferred embodiment of the present disclosure, the ceiling vision robot in the seventh embodiment of the present disclosure monitoring the effective of existing road signs according to the distribution information of existing road signs, as shown in FIG. 2, specifically includes: when there are existing road signs in the ceiling image, the ceiling vision robot selects one of the existing road signs that has not been effectively detected as the current road sign from the existing road signs in the ceiling image, and obtains the first positioning pose corresponding to the road sign from the road sign information corresponding to the current road sign; it should be noted that each road sign has a one-to-one corresponding positioning pose, and the positioning pose corresponding to each road sign is recorded when it is established.

The ceiling vision robot obtains the current second positioning pose of the ceiling vision robot based on the visual sensor and the inertial sensor; specifically, this step is based on the vision-inertial system calculation composed of the ceiling-facing vision sensor and the inertial sensor mounted on the ceiling vision robot body to obtain the current second positioning pose of the ceiling vision robot; judging whether the first positioning pose and the second positioning pose are the same, if the first positioning pose and the second positioning pose are the same, confirm that the first positioning pose corresponding to the current road sign is valid; it should be noted that if the first positioning pose corresponding to the current road sign is valid, it means that the current road sign can be used as the positioning reference object of the ceiling vision robot.

If the positioning of the first positioning pose and the second positioning pose are not the same, calculate the first pose difference between the first positioning pose and the second positioning pose, and judge whether the first pose difference between the first positioning pose and the second positioning pose is less than the preset difference threshold, if the first pose difference between the first positioning pose and the second positioning pose is less than the preset difference threshold, then it is confirmed as the first positioning pose corresponding to the current road sign is valid; if the first pose difference between the first positioning pose and the second positioning pose is greater than or equal to the preset difference threshold, the road sign positioning consistency of the current road sign is calculated according to all recorded observed road signs, determine whether the road sign positioning consistency of the current road sign meets the road sign positioning consistency requirements. If the road sign positioning consistency of the current road sign meets the road sign positioning consistency requirements, it is confirmed that the first positioning pose corresponding to the current road sign is valid. If the road sign positioning consistency does not meet the road sign positioning consistency requirements, it is confirmed that the first positioning pose corresponding to the current road sign is invalid; Specifically, the all recorded observed road signs refers to every road sign that meets the recording conditions in the road sign previously observed by the ceiling vision robot, which will be recorded in all recorded observed road signs. The recording condition can be, but not limited to, that the road sign has never been observed, etc Duplicate condition.

The above steps are repeated until it is confirmed whether the positioning of all existing road signs existing in the ceiling image is valid or not. The effective road sign detection method provided by this present disclosure considers the road sign consistency of the current road sign positioning pose when the observed positioning pose of the current road sign is different from the ceiling vision robot positioning pose obtained based on the visual-inertial system. Identify the invalid positioning of road signs that do not meet the road sign consistency requirements, avoid the problem of ceiling vision robot positioning errors due to incorrect recognition of road signs, and make the positioning accuracy of ceiling vision robots based on road signs higher and have better reliability.

Based on the above-mentioned embodiments, as a preferred embodiment of the present disclosure, the method for calculating the consistency of the current road sign position based on all recorded observed road signs described in the eighth embodiment of the present disclosure specifically includes: combining the current road sign with all the recorded observed road signs are positioning matched one by one, counting the number of road signs in all recorded observed road signs that are consistent with the current road sign position, and confirming the consistency of current road sign positioning based on the number of road signs in all recorded observed road signs that are consistent with the current road sign position. Specifically, it should be noted that the consistency of road sign positioning is positively correlated with the number of road signs in all recorded observed road signs that are consistent with the current road sign position. When the number of road signs in all recorded observed road signs that are consistent with the current road sign positioning is greater, the higher the road sign positioning consistency of the current road signs is. Therefore, in the method provided by the embodiment, by calculating the number of road signs that are consistent with the current road sign positioning in all recorded observed road signs, so as to confirm the consistency of the road sign positioning of the current road sign. The higher the road sign positioning consistency of the current road sign, the higher the reliability of the first positioning pose corresponding to the current road sign. In this embodiment, the reliability of the current road sign is known by calculating the road sign positioning consistency of the current road sign, so as to grasp the situation of the road sign.

Based on the above-mentioned embodiments, as a preferred embodiment of the present disclosure, in the ninth embodiment of the present disclosure, The method for the current road sign and all recorded observed road signs are positioned and matched one by one, and counting the number of road signs that are consistent with the current road sign position in all recorded observed road sign, specifically includes: Step 1: Select one of the observed road signs that has not been positioning consistent matching from all recorded observed road signs as the current positioning consistent matching road sign; specifically, From all recorded observed road signs, select the observed road signs that have not been positioning consistent matching as the current positioning consistent matching road signs, that is, select the observed road signs for positioning consistent matching, and judge the existing road signs that have not been positioning consistent matching in all recorded observed road signs, and realize the traversal of all recorded observed road signs for consistent positioning and matching, without missing any observed road signs, ensuring the accuracy of consistent matching of road signs. It should be noted that the above-mentioned all recorded observed road signs means that every time a ceiling vision robot encounters a road sign that meets the recording conditions in the past observed road signs, the road sign will be recorded into all recorded observed road signs; specifically, the recording condition may be, but not limited to, conditions such that the road sign has never been observed and can limit that the recorded observed road signs are not repeated.

Step 2: Obtain the observation moment of the current positioning consistent matching road sign and obtain the positioning pose corresponding to the current positioning consistent matching road sign; specifically, each road sign has a one-to-one corresponding observation moment and a one-to-one corresponding positioning pose, so the observation time mentioned above refers to the moment when the road sign is observed. It should be noted that the observation time corresponding to each road sign changes and is not static. When a road sign is re-observed, the corresponding observation time of the road sign is updated to the current moment; the positioning pose refers to the positioning pose recorded when the road sign is observed for the first time, and the positioning pose corresponding to each road sign does not change with the corresponding observation time.

Step 3: Calculating the second pose difference between the first positioning pose corresponding to the current road sign and the positioning pose corresponding to the current positioning consistent matching road sign;

Step 4: According to the inertial sensor of the ceiling vision robot, calculate the first displacement distance of the ceiling vision robot in the time period from the observation moment of the current positioning consistent matching road sign to the observation moment of the current road sign; specifically, the inertial sensor is based on the coded disc and gyroscope accumulate and calculate the displacement distance of the ceiling vision robot in real time.

Step 5: Judging whether the second pose difference is the same as the first displacement distance, if the second pose difference is the same as the first displacement distance, then confirm that the positioning of the current positioning consistent matching road sign consistent with the positioning of the current road sign, control the number of road signs that are consistent with the current road sign positioning in all recorded observed road signs to increase by 1, if the second pose difference is not the same as the first displacement distance, it is confirmed that the current positioning matching road sign is inconsistent with the current road sign, keep the number of road signs that are consistent with the positioning of the current road sign in all recorded observed road signs; repeat steps 1 to 5 above until there are no existing observed road signs that have not been positioning consistent matching in all recorded observed road signs, and obtain the number of road signs that are consistent with the current road sign position in all recorded observed road signs. In this embodiment, the positions consistent situation of all recorded observed road signs and the current road signs are determined by sequential traversal, and each time the position of the current road signs existing in all recorded observed road signs are consistent with the current road signs, the number of road signs that are consistent with the current road sign positioning in all recorded observed road signs is increased by 1. On the contrary, when there is no observed road signs that are consistent with the current road signs, the number of road signs that are consistent with the current road sign positioning in all recorded observed road signs remains unchanged to achieve accurate statistics of the number of road signs in all recorded observed road signs that position are consistent with the current road signal recorded road signs.

Based on the above-mentioned embodiments, as a preferred embodiment of the present disclosure, the consistency of the current road sign position in the tenth embodiment of the present disclosure refers to the number of road sign that position is consistent with the position of the current road sign reaches a first number threshold in all recorded observed road signs; wherein, the first number threshold is positively correlated with the first pose difference. Specifically, the first number threshold is a changeable and adjustable value used to limit whether the degree of consistency of the current road signs meets the requirements; when the number of road signs that are consistent with the current road signs in all recorded observed road signs is greater, It means that the positioning consistency of the current road sign is higher, and conversely, when the number of road signs consistent with the current road sign positioning in all the recorded observed road signs is smaller, it means that the positioning consistency of the current road sign is lower. If the positioning consistency of the current road sign is high, it means that the positioning accuracy of the current road sign is high, and the reliability of the first positioning pose corresponding to the current road sign is high; if the positioning consistency of the current road sign is low, it means that the current road sign corresponds to the reliability of the first positioning pose of is low, and the accuracy of the current road signs needs to be further tested.

Specifically, the positive correlation between the first number threshold and the first pose difference means that when the first pose difference between the first positioning pose and the second positioning pose is large, the first number threshold is adjusted to be larger accordingly, and on the contrary, when the first pose difference between the first positioning pose and the second positioning pose is small, the first number threshold is correspondingly adjusted to be smaller, For example, when the first pose difference between the first positioning pose and the second positioning pose is small, the first number threshold is set to 2, then When the number of road signs consistent with the current road sign positioning reaches 2 or more, the road sign consistency of the current road sign meets the road sign consistency requirements; when the first pose difference between the first positioning pose and the second positioning pose is large, the first number threshold is set to 5, and only when the number of road signs consistent with the current road sign positioning in all recorded observed road signs reaches 5 or more, the road sign consistency of the current road sign meets the road sign consistency requirements; if the number of road signs consistent with the current road sign positioning in all recorded observed road signs does not reach 5, the road sign consistency of the current road sign does not meet the road sign consistency requirements. It should be noted that the first number threshold is configured as a value of different sizes according to the size of the first pose difference, and the first number threshold may be, but not limited to, an integer greater than 0. In this embodiment, by linking the road sign position consistency of the current road sign with the number of road signs that are consistent with the current road sign position in all recorded observed road signs, the number of road signs whose position of the current road signs in all recorded observed road signs is consistent with the current road sign position can directly grasp the road sign positioning consistency of the current road signs, and at the same time control the road sign consistency requirements to be positively correlated with the first pose difference, so that during the positioning process, it can be determined whether it is necessary to adjust the road sign consistency requirements based on the initial pose difference, and the reliability of road sign positioning can be improved through multiple flexible determination methods.

Based on the above-mentioned embodiments, as a preferred embodiment of the present disclosure, in the eleventh embodiment of the present disclosure, when all the recorded observed road signs have been positioning and matching based on sequentially traversed, when the number of road signs in the all recorded observed road signs consistent with the position of the current road signs is zero, the current road signs are recorded as observed road signs, and all recorded observed road signs are updated. In this embodiment, after all the recorded observed road signs have been traversed and judged, when all the recorded observed road signs have been positioning and matching based on sequentially traversed, when the number of road signs in the all recorded observed road signs consistent with the position of the current road signs is zero, the current road signs are recorded as observed road signs, and realizing to record the unobserved road signs in the observed road signs, and all recorded observed road signs are added, to ensure the comprehensiveness and reliability of all recorded observed road signs.

Based on the above embodiments, as a preferred embodiment of the present disclosure, in the twelfth embodiment of the present disclosure, the method for recording the current road sign as an observed road sign specifically includes: according to the road sign information corresponding to the current road sign, to obtain and record the first positioning pose corresponding to the current road sign, and record the observation moment of the current road sign at the same time. It should be noted that the information used by all recorded observed road signs in the present disclosure is mainly the positioning pose corresponding to the observed road signs and the observation time corresponding to the observed road signs. In the actual application process, the method for recording the current road sign as an observed road sign may also include recording other relevant information about the current road sign. The observation time of the current road sign can be changed and updated.

Based on the above embodiments, as a preferred embodiment of the present disclosure, in the thirteenth embodiment of the present disclosure, the method for recording the current road sign as an observed road sign specifically includes: according to the road sign information corresponding to the current road sign, to obtain and record the first positioning pose corresponding to the current road sign, and record the observation moment of the current road sign at the same time. It should be noted that the information used by all recorded observed road signs in the present disclosure is mainly the positioning pose corresponding to the observed road signs and the observation time corresponding to the observed road signs. In the actual application process, the described The method for recording the current road sign as an observed road sign may also include recording other relevant information about the current road sign. It should be noted that the observation time of the current road sign can be changed and updated.

Based on the above embodiments, as a preferred embodiment of the present disclosure, in the fourteenth embodiment of the present disclosure, when the position of the observed road sign is consistent with the position of the current road sign, the observation time of the observed road sign is updated to the current road sign observation time. Since the position of the current road sign is consistent with the observed road sign, it means that the ceiling vision robot has observed the observed road sign again at the current moment, so the observation time of the current road sign is updated to the observation moment corresponding to the observed road sign, indicating that the observed road sign are observed again. In this embodiment, the observation time corresponding to the observed road signs is updated correspondingly based on the judging result of the position consistency between the observed road signs and the current road signs, so that the observation times corresponding to all recorded observed road signs remain the latest observation time.

Based on the above-mentioned embodiments, as a preferred embodiment of the present disclosure, in the fifteenth embodiment of the present disclosure, when the recorded observation time of the observed road signs reaches the first time threshold from the current time, the observed road signs are deleted from all recorded observed road signs and all recorded observed road signs are updated. Specifically, the first time threshold is used to limit the maximum length of time that the observed road signs need to be observed again. The first time threshold is consider the settings integrated according to various factors such as the actual application scene of the ceiling vision robot and the moving speed of the ceiling vision robot. When the observed road sign has not been re-observed for longer than the maximum length of time, the observed road sign is considered invalid, and it needs to be deleted from all recorded observed road signs, reducing the computational burden of the ceiling vision robot algorithm and improving the positioning of the ceiling vision robot efficiency.

Apparently, the above-mentioned embodiments are only a part of the embodiments of the present disclosure, rather than all the embodiments, and the technical solutions of the various embodiments can be combined with each other. In the above-mentioned embodiments of the present disclosure, the descriptions of each embodiment have their own emphases, and for parts not described in detail in a certain embodiment, reference may be made to relevant descriptions of other embodiments. In the several embodiments provided by the present disclosure, it should be understood that the disclosed technical content can be realized in other ways. In addition, it should be noted that the various specific technical features described in the above specific implementation manners may be combined in any suitable manner if there is no contradiction. In order to avoid unnecessary repetition, various possible combinations are not further described in the embodiments of the present disclosure.

Finally, it should be noted that: the above embodiments are only used to illustrate the technical solutions of the present disclosure, rather than limiting them; although the present disclosure has been described in detail with reference to the foregoing embodiments, those of ordinary skill in the art should understand that: It is still possible to modify the technical solutions described in the foregoing embodiments, or perform equivalent replacements for some or all of the technical features; and these modifications or replacements do not make the essence of the corresponding technical solutions deviate from the technical solutions of the various embodiments of the present disclosure.

What is claimed is:

1. A positioning method for a ceiling vision robot, comprising:

acquiring, by the ceiling vision robot, ceiling images in real time during its movement;

obtaining and recognizing, by the ceiling vision robot, existing road signs distribution information according to the ceiling image;

judging, by the ceiling vision robot, whether to establish a new road sign according to the existing road signs distribution information; wherein, in a case of determining to establish the new road sign, the ceiling vision robot is controlled to establish a new road sign at an acquisition position of the ceiling image; in a case of determining not to establish the new road sign, the ceiling vision robot is controlled not to establish a new road sign at the acquisition position of the ceiling image;

monitoring, by the ceiling vision robot, position effectiveness of existing road signs based on the existing road sign distribution information; wherein, in a case that the existing road sign positioning is valid, the ceiling vision robot is positioned using pose information corresponding to the existing road signs; in a case that the existing road sign positioning is invalid, then the pose information corresponding to the existing road sign is not used to locate the ceiling vision robot, wherein, obtaining and recognizing, by the ceiling vision robot, the existing road signs distribution information according to the ceiling image, comprises:

recognizing, by the ceiling vision robot, whether there are existing road signs in the ceiling image, comprising: extracting, by the ceiling vision robot, corner features from the ceiling image;

matching the corner features with features of all the existing road signs; wherein, in a case that the features of the existing road signs are successfully matched with the corner features, it is confirmed that there are the existing road signs in the ceiling image and the existing road signs successfully matched with the corner features is recorded as the existing road signs in the ceiling image, and in a case that no feature of the existing road signs is successfully matched with the corner features, it is confirmed that there are no the existing road signs in the ceiling image;

in a case that the road signs exists, calculating distance respectively between all the existing road signs in the ceiling image and an acquisition position of the ceiling image as the existing road sign distribution information;

in a case that the road signs not exist, calculating the distance respectively between all the existing road signs that have been established and the acquisition position of the ceiling image, and obtaining corresponding illumination information of all the existing road signs that have been established when they are established; wherein, the distance respectively between all the existing road signs that have been established and the acquisition position of the ceiling image, and the illumination information corresponding to all the established road signs when they are established are used as the existing road signs distribution information, wherein, judging, by the ceiling vision robot, whether to establish the new road sign according to the existing road signs distribution information, comprises:

when there are the existing road signs in the ceiling image, judging whether the distance respectively between all the existing road signs in the ceiling image and the acquisition position of the ceiling image is greater than a first distance threshold according to the acquired existing road sign distribution information, and in a case of being greater than the first distance threshold, controlling the ceiling vision robot establishes the new road sign in the acquisition position of the ceiling image, in a case of not being greater than the first distance threshold, controlling the ceiling vision robot not to establish the new road sign in the acquisition position of the ceiling image;

when there is no the existing road sign in the ceiling image, judging according to the obtained existing road sign distribution information whether there is a road sign whose distance from the acquisition position of the ceiling image is less than a second distance threshold among all the existing road signs that have been established, and in a case that the road sign whose distance from the acquisition position of the ceiling image is less than the second distance threshold not exists, controlling the ceiling vision robot establishes the new road sign at the acquisition position of the ceiling image, in a case that the road sign whose distance from the acquisition position of the ceiling image is less than the second distance threshold exists, according to the acquired distribution information of the existing road sign judging whether illumination information corresponding to the ceiling image is different with illumination information corresponding to all the existing road signs when they are built in a shaped area of the acquisition position of the ceiling image as a center and the radius as the second distance threshold, in a case that the illumination information corresponding to the ceiling image is different with the illumination information corresponding to all the existing road signs when they are built in the shaped area, controlling the ceiling vision robot to create the new road sign at the acquisition position of the ceiling image, in a case that the illumination information corresponding to the ceiling image is not different with the illumination information corresponding to all the existing road signs when they are built in the shaped area, controlling the ceiling vision robot to not create the new road sign at the acquisition position of the ceiling image.

2. The positioning method of ceiling vision robot according to claim 1, wherein, judging, by the ceiling vision robot, whether to establish the new road sign according to the existing road signs distribution information, further comprises: when duration of the ceiling vision robot observes in real time during the moving process that there is no the existing road sign in the ceiling image reaches a first time threshold, establishing, by the ceiling vision robot, the new road sign at the acquisition position of the ceiling image.

3. The positioning method of ceiling vision robot according to claim 2, wherein, the ceiling vision robot establishes the new road sign at the acquisition position of the ceiling image, comprises:

acquiring and recording, by the ceiling vision robot, the road sign information corresponding to the new road sign at the acquisition position of the ceiling image; wherein, the road sign information comprises: pose information of the ceiling vision robot at the acquisition position of the ceiling image, angle information of the ceiling vision robot at the acquisition position of the ceiling image, pose information of the road sign relative to the ceiling vision robot, corresponding illumination information when the ceiling vision robot acquires the ceiling image, the corner features of the ceiling image that the ceiling vision robot acquired which are used as features of the road signs and a latest observation moment of the road signs.

4. The positioning method of the ceiling vision robot according to claim 3, wherein, monitoring, by the ceiling vision robot, positions effectiveness of existing road signs based on the existing road sign distribution information, comprises:

when there are the existing road signs in the ceiling image, selecting, by the ceiling vision robot, one of the existing road signs that has not been effectively detected as a current road sign from all the existing road signs in the ceiling image, and obtaining the first positioning pose of the current road sign from the road sign information corresponding to the current road sign;

obtaining, by the ceiling vision robot a current second positioning pose of the ceiling vision robot based on the vision sensor and a inertial sensor;

judging whether the first positioning pose and the second positioning pose are the same;

in a case that the first positioning pose and the second positioning pose are the same, confirming the first positioning pose corresponding to the current road sign is valid;

in a case that the first positioning pose and the second positioning pose are positioned differently, calculating a first pose difference between the first positioning pose and the second positioning pose;

judging whether the first pose difference between the first positioning pose and the second positioning pose is less than a preset difference threshold;

in a case that the first pose difference is less than the preset difference threshold, confirming the first positioning pose corresponding to the current road sign is valid;

in a case that the first pose difference is not less than the preset difference threshold, calculating a road sign positioning consistency of the current road sign based on all recorded observed road signs, and judging whether the road sign positioning consistency of the current road sign meets the road sign positioning consistency requirements, wherein, in a case that the road sign positioning consistency of the current road sign meets the road sign positioning consistency requirements, it is confirmed that the first positioning pose corresponding to the current road sign is valid, and in a case that the road sign positioning consistency of the current road sign does not meet the road sign positioning consistency requirements, it is confirmed that the first positioning pose corresponding to the current road sign is invalid;

repeating the above steps until it is confirmed whether the positioning of all the existing road signs existing in the ceiling image is valid or not.

5. The positioning method of the ceiling vision robot according to claim 4, wherein, calculating the road sign positioning consistency of the current road sign based on the all recorded observed road signs, comprises:

matching the consistency of the current road signs with the all recorded observed road signs one by one, and counting the all recorded observed road signs that are consistent with the current road signs; determine the consistency of the current road sign positioning based on the number of road signs that are consistent with the current road sign positioning in the all recorded observed road signs.

6. The positioning method of the ceiling vision robot according to claim 5, wherein, matching the consistency of the current road signs with the all recorded observed road signs one by one, and counting the all recorded observed road signs that are consistent with the current road signs, comprises:

step 1: selecting one of the observed road signs that has not been positioning consistent matching from the all recorded observed road signs as a current positioning consistent matching road sign;

step 2: obtaining an observation moment of the current positioning consistent matching road sign and obtaining the positioning pose corresponding to the current positioning consistent matching road sign;

step 3: calculating a second pose difference between the first positioning pose corresponding to the current road sign and the positioning pose corresponding to the current positioning consistent matching road sign;

step 4: according to the inertial sensor of the ceiling vision robot, calculating a first displacement distance of the ceiling vision robot within a time period from the observation moment of the current positioning consistent matching road sign to an observation moment of the current road sign;

step 5: determining whether the second pose difference is the same as the first displacement distance, in a case that the second pose difference is the same as the first displacement distance, confirming the current positioning matching road sign and the current road sign are position consistent, and controlling the number of road signs that are consistent with the current road sign positioning in the all recorded observed road signs to increase by 1, in a case that the second pose difference is not the same as the first displacement distance, confirming the current positioning matching road sign is positioning inconsistent with the current road sign, and remaining the number of road signs that are consistent with the current road sign positioning in all recorded observed road signs unchanged;

repeating step 1 to step 5 above until there is no observed road sign that has not been positioning consistent matching in the all recorded observed road signs, and obtaining the number of road signs that are consistent with the current road sign positioning in the all recorded observed road signs.

7. The positioning method of the ceiling vision robot according to claim 6, wherein, the consistency of the current road sign positioning means that the number of the road signs in the all recorded observed road signs that is consistent with the current road sign positioning reaches a first quantity threshold; the difference values between the first number threshold and the first pose difference are positively correlated.

8. The positioning method of the ceiling vision robot according to claim 6, wherein, when the all recorded observed road signs have been positioning consistent matching in sequence, and the number of road signs in all recorded observed road signs that are consistent with the current road signs positioning is zero, the current road sign is recorded as the observed road sign and the all recorded observed road signs are updated.

9. The positioning method of the ceiling vision robot according to claim 8, wherein, recording the current road sign as the observed road sign, comprises:

acquiring and recording the first positioning pose corresponding to the current road sign according to the road sign information corresponding to the current road sign, and recording the observation moment of the current road sign at the same time.

10. The positioning method of the ceiling vision robot according to claim 9, wherein, when a position of the observed road sign is consistent with that of the current road sign, the observation moment of the observed road sign is updated to the observation moment of the current road sign.

11. The positioning method of the ceiling vision robot according to claim 9, wherein, when a time length between the observed moment of the recorded observed road sign and the current moment reaches the first time threshold, the observed road sign is deleted from the all recorded observed road signs, and the all recorded observed road signs are updated.

* * * * *